No. 730,113. PATENTED JUNE 2, 1903.
E. GUINET.
MACHINE FOR MANUFACTURING METALLIC LEASHES USED IN WEAVING.
APPLICATION FILED JAN. 28, 1902.
NO MODEL. 2 SHEETS—SHEET 1.
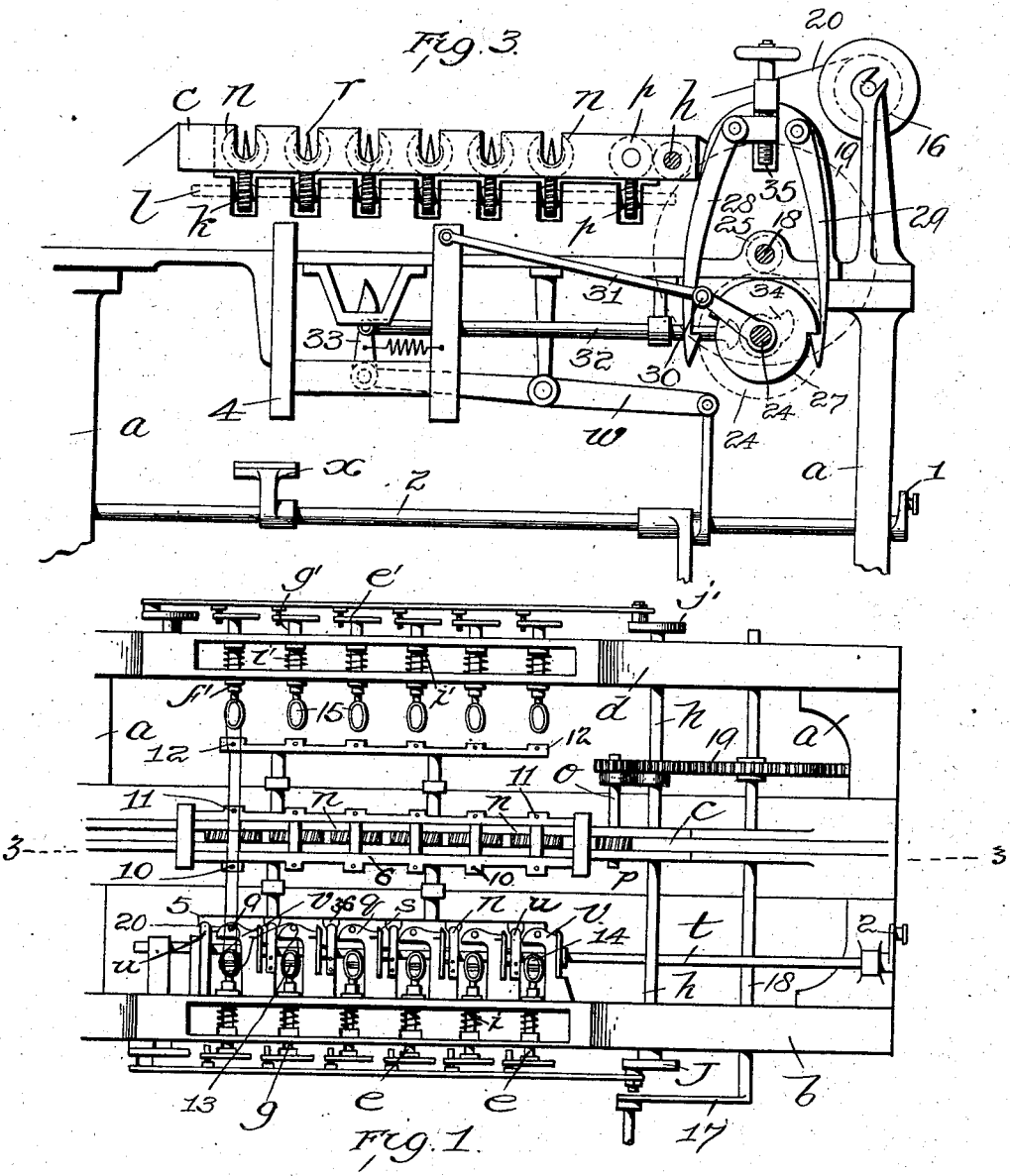

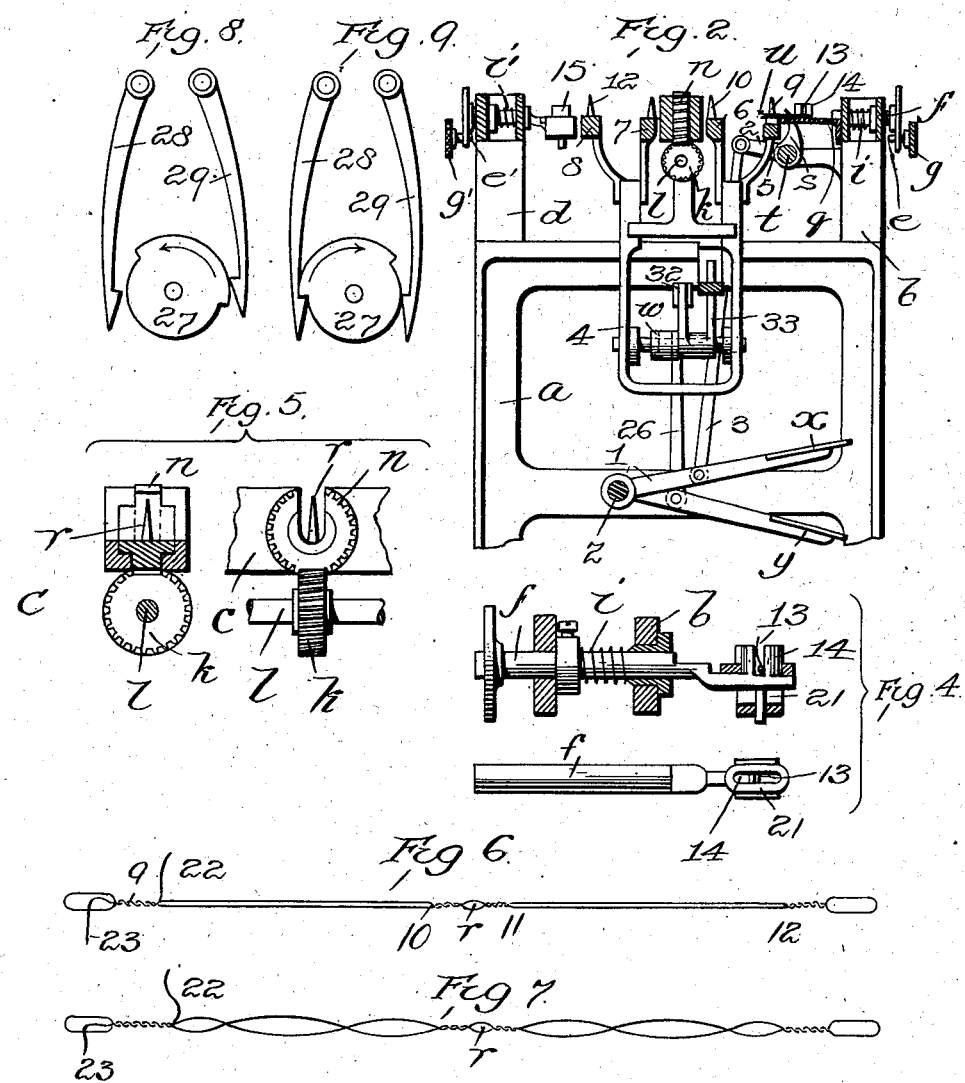

No. 730,113. Patented June 2, 1903.

UNITED STATES PATENT OFFICE.

EUGÈNE GUINET, OF FURES-TULLINS, FRANCE.

MACHINE FOR MANUFACTURING METALLIC LEASHES USED IN WEAVING.

SPECIFICATION forming part of Letters Patent No. 730,113, dated June 2, 1903.

Application filed January 28, 1902. Serial No. 91,612. (No model.)

*To all whom it may concern:*

Be it known that I, EUGÈNE GUINET, a citizen of France, residing at Fures-Tullins, Isère, France, have invented a new and useful Machine for Manufacturing Metallic Leashes Used in Weaving, of which the following is a full, clear, and exact description, and for which I have made application for patent in France, dated July 5, 1901; in Great Britain, dated July 26, 1901, and in Belgium, dated July 26, 1901.

The machine forming the object of this invention is intended for the simultaneous manufacture of a series of metallic leashes. It is characterized by a regulating apparatus automatically regulating not only the twist, but also the final direction of the eye in relation to the suspension-loops in such manner that all the leashes made on the machine when once regulated are exactly alike and ready to be assembled to constitute the heddle.

The accompanying drawings represent an example of a machine worked by hand and making six leashes at once. The number of leashes is, however, only limited by the strength of the operative and can extend without inconvenience to twenty leashes or even more.

Figure 1 is a plan of the machine. Fig. 2 is a transverse section of Fig. 1. Fig. 3 is a longitudinal section on the line 3 3 of the same figure. Figs. 4 are detail views of a torsion-spindle. Figs. 5 are detail views of a central torsion-pinion. Figs. 6 and 7 are views of the leash at various stages of manufacture. Figs. 8 and 9 represent different positions of the regulator.

On two vertical frames *a a* are arranged horizontally three bars *b c d*, which carry transversely the principal parts intended for the torsion of the leash. The front bar *b* carries the spindles *f f*, which hold the leashes *m m* by one of their ends and receive simultaneous rotary motion by means of crank-pins *e e*, connected together and operated by a common connecting-rod *g*, receiving motion from a similar crank-pin *j*, carried by a disk on the shaft *h*. The spindles *f* are capable of sliding in their supports, thereby compressing the springs to enable them to accommodate themselves to the shortening of the leash resulting from the torsion. On the rear bar *d* are the spindles *f'*, which hold the opposite ends of the leashes *m* and which are mounted, like the above, with springs *i'* and are connected together by a connecting-rod *g'*, operated by the crank-pin *j'*, also carried by a disk on the shaft *h*. The spindles *f f'* are terminated, respectively, by projections 14 15, having the exact form of the leash-loops. Those in front are split transversely in their middle, and in this split is inserted a spring 13, acting as nippers. Figs. 4 show in two views, drawn to a larger scale, the form of this spindle. The middle bar *c* carries small pinions *n*, having helicoidal teeth (shown to a larger scale in Figs. 5) and driven at right angles by similar pinions *k*, fixed on a lower shaft *l*, driven by the shaft *o* by means of similar pinions *p p*. Each of the pinions *n n*, Figs. 1 and 5, is split in the center of the circumference, as also its trunnions and its supports, so as to be enabled to receive in its center the middle of the leash *m*, the two strands of which are separated by a needle *r* of diameter according to the form of the central eye of the leash and fixed to the bottom of the split of the pinion. To the front bar are also fixed plates *q*, carrying to the left of each leash *m* a spring-nipper *u* and to the right of the same leashes shears, each formed of a fixed plate *v* and of a movable plate *s*, keyed upon a longitudinal shaft *t*. This shaft receives an oscillating motion from a pedal *x*, keyed upon the shaft *z*, and by the intervention of cranks 1 2 and connecting-rod 3. Finally, below the fixed bars *b c d* is arranged a frame 4, movable in the vertical direction and capable of being raised by the pedal *y* by means of the double-ended lever *w* and connecting-rod 26. This frame carries four bars 5 6 7 8, parallel with the fixed bars, and upon which are fixed vertical needles 9 10 11 12, entering between the strands of each leash. The needles 10 11 are arranged on each side of the central eye *r*. 9 and 12 are arranged near the projections 14 15. This frame also carries a fifth bar furnished with projections 36, upon which bear the springs constituting the nippers *u*.

Omitting the regulator, the functions of which will be hereinafter explained, I will now explain the formation of the leashes.

The machine is put in motion by a crank 17, keyed upon a shaft 18, which by a large toothed wheel 19 drives at a much-increased speed the two shafts $h$ and $o$. By means of the crank 17 the projections 14 15 and the split of the pinions $n$ are brought upward to permit of the mounting of the wire to form the leashes. The four movable bars 5 6 7 8 are in their highest position. The steel wire 20, which is to form the leashes, is wound on a bobbin 16 to the right of the machine. For mounting the wire the operative fixes the end of this wire under the first nipper $u$ at the left, Fig. 1, then forms the first leash by causing the wire successively to pass stretched behind the needle 9, then to the left of the projection 14, and, passing around this projection to the right of the needles 9 10 $r$ 11 12 and of the projection 15, then returning by the left of these same needles into the nippers formed by the spring 13 into the open shears $v\ s$, and finally into the second nippers $u$, whence it envelops in the same manner the parts forming the second leash, and so on to the last shears on the right. At this moment by pressing upon the pedal $x$ the shears $v\ s$ are closed, so as to separate the leashes, the wire of which remains held by its extremities in the nippers $u$ and 13. Then by acting on the crank 17 the two spindles $f\,f'$ and the pinion $n$ can be caused to turn simultaneously and in the same direction. There is thus obtained (see Fig. 6) a first torsion forming the end loops and the central eye of the leash and stopping at the needles 9 10 11 12, between which the wires remain straight and stretched. When this first torsion, which should be sufficiently tight, is completed, a releaser, operated by the regulator, allows the frame 4 to fall. The needles 9 10 11 12, as also the projections 36, which hold the wire under the nippers $u$, disappear at the same time. This wire being rendered free and the crank continuing to be operated, the parts 9, 10, 11, and 12 receive a slight torsion, which completes the leash. (See Fig. 7.) If the leashes were removed in this state, the elasticity of the steel wire would cause them to undergo a natural detorsion or untwisting, which would interfere more or less with their regularity. This inconvenience is avoided by effecting this detorsion or untwisting on the machine itself by the backward motion of the crank. This latter movement is stopped when the projections 14 and 15 and the split of the pinions $n$ are upward to permit of the removal of the leashes. This removal is facilitated by a movable sheath 21, (see Fig. 4,) inclosing the projections 14 and 15, and which removes the wire when it is raised by hand. There remains only to cut off the surplus wires 22 23 (see Fig. 7) to finish the leash.

The regulator has for its object to regulate exactly the three times of tight torsion, of lengthwise torsion, and of detorsion or untwisting which compose the manufacture. It is mounted on a shaft 24, driven by the driving-shaft 18 by means of toothed wheels 25. On this shaft 24 is keyed, first, a ratchet-wheel 27 of two teeth acted upon by two pawls 28 and 29 in contrary directions, and, secondly, a cam 34, acting upon a bar 32, jointed to a spring-latch lever 33, which holds the frame 4 at the upper part of its course when it has been raised by the pedal $y$. The shaft 24 makes exactly one revolution during the manufacture of a leash. At the start the ratchet-wheel 27 rests against the right-hand pawl 29. (See Fig. 3.) The left-hand pawl 28 is held away from the ratchet-wheel by a stop 30, held by the inclined connecting-rod 31, jointed on the movable frame 4. By turning the crank 17 forward the ratchet-wheel turns in the direction of the arrow during the time necessary to obtain the first torsion. Then the eccentric 34 encounters the bar 32, pushes back the latch-lever 33. The frame 4 then falls by its weight or by springs, and the second torsion commences; but in falling the frame 4 has straightened the connecting-rod 31 and pushed back the stop 30. The pawl 28 then comes into contact with the ratchet-wheel 27, which thus assumes the position similar to that shown at Fig. 8. By continuing its course it will stop against the pawl 28 at the moment when the second torsion should be finished. (See Fig. 9.) At this moment the tooth corresponding with the pawl 29 will have passed the latter, and the crank can be caused to return backward until this tooth comes into contact with the ratchet-wheel to obtain the detorsion or untwisting. The ratchet-wheel will then have returned to the position shown at Fig. 3, and there only remains to raise the frame 4 by means of the pedal $y$ to recommence a new series of leashes.

The pawl 29 is so formed as to give always the starting-point. The pawl 28 is regulable in height by the screw 35 in order to vary the angle of return of the ratchet-wheel, (see Fig. 3,) and consequently the degree of detorsion or untwisting. The cam 34 is adjustably fixed on its shaft in order to be able to accelerate or retard the fall of the frame 4 and to thus proportion according to requirements the respective durations of the first and second torsions. The total amount of torsion represented by one complete revolution of the ratchet-wheel 27 can be regulated by the proportions of the gears 25, which enables a greater or less number of rotations to be given to the crank 17 for one revolution of the ratchet-wheel.

I would here remark that the details of construction and transmission of motion may be varied according to the applications and according to whether hand or power driving is adopted.

Having fully described my invention, what I claim, and desire to secure by Letters Patent, is—

1. In a machine for manufacturing metallic leashes used in weaving, the combination of torsion-spindles $f\,f'$, projections 14, 15 on said spindles of the form of the leash-loops, means for simultaneously rotating all of said spindles, centrally-split pinions $n$, means for simultaneously rotating all of said pinions, a needle $r$ in the center of the split of each pinion to form the eye of the leash, movable needles 9, 10, 11, 12 to limit the torsion, a series of shears $v$ $s$ to cut off the wire forming each leash, said shears being arranged between the adjacent spindles $f$ and nippers 13 and $u$ to hold the wire after it has been cut, said nippers 13 being arranged on the projections 14 and the said nippers $u$ being arranged adjacent said blocks and shears, substantially as herein set forth.

2. In a machine for manufacturing metallic leashes used in weaving, the combination with means for twisting the wire, forming the loops at the ends of the leash, and forming the eye at the center thereof, of a regulator consisting of a two-toothed ratchet-wheel 27, a pawl pivoted to a fixed stud and acting on one side of said ratchet-wheel, and an adjustably-pivoted pawl acting on the other side of said ratchet-wheel, to limit automatically the duration of the three operations of tight torsion, lengthwise torsion, and detorsion or untwisting, so as to render exactly alike all the leashes made on a machine, substantially as herein set forth.

3. In a machine for manufacturing metallic leashes, the combination of the torsion-spindles, a crank on each of said spindles, a connecting and driving rod connecting all the cranks of the spindles on each side of the machine, a centrally-split pinion between each pair of torsion-spindles, a needle in the split of each pinion of the form of the eye of the leash, a series of pinions on a single driving-shaft gearing with the split pinions, and helicoidal teeth on all of said pinions, substantially as herein set forth and for the purpose stated.

4. In a machine for making metallic leashes, the combination of means for twisting the wire to form the leashes, comprising spindles, nippers 13, 14, on certain of said spindles, nippers $u$, independent of the spindles but located adjacent thereto, projections 36 coöperating with the nippers $u$, a cross-bar carrying the said projections and means for operating the cross-bar, substantially as described.

5. In a machine for manufacturing metallic leashes used in weaving, the combination with means for twisting the wire, forming said leashes, and means for forming the end loops and central eye, of movable needles to limit the extent of torsion, a vertically-movable frame carrying said needles, means for raising said frame, a spring-actuated latch-lever for locking said frame in its highest position, a cam to release the latch-lever from the frame, a regulator consisting of a two-toothed ratchet-wheel and pawls acting on opposite sides thereof, and a shaft carrying said cam and two-toothed ratchet-wheel, substantially as herein set forth.

In witness whereof I have hereunto set my hand in presence of two witnesses.

EUGÈNE GUINET.

Witnesses:
GASTON JEAUNIAUX,
THOS. N. BROWNE.